(12) United States Patent
Bernhardt

(10) Patent No.: US 11,425,914 B2
(45) Date of Patent: Aug. 30, 2022

(54) DEVICE FOR ORIENTING WOUND DOUGH PRODUCTS IN A DEFINED END POSITION

(71) Applicant: Fritsch GmbH, Markt Einersheim (DE)

(72) Inventor: Udo Bernhardt, Iphofen (DE)

(73) Assignee: FRISCH BAKERY TECHNOLOGIES GMBH & CO. KG, Markt Einersheim (DE)

( * ) Notice: Subject to any disclaimer, the term of this patent is extended or adjusted under 35 U.S.C. 154(b) by 187 days.

(21) Appl. No.: 15/217,472

(22) Filed: Jul. 22, 2016

(65) Prior Publication Data
US 2016/0330979 A1 Nov. 17, 2016

Related U.S. Application Data

(62) Division of application No. 13/883,225, filed as application No. PCT/DE2011/001831 on Oct. 11, 2011, now abandoned.

(30) Foreign Application Priority Data

Nov. 9, 2010 (DE) ...................... 10 2010 050 671.0
Feb. 11, 2011 (DE) ...................... 10 2011 011 049.6

(51) Int. Cl.
A21C 9/08 (2006.01)
A21D 6/00 (2006.01)
A21D 2/02 (2006.01)
B65G 15/16 (2006.01)
B65G 15/62 (2006.01)

(52) U.S. Cl.
CPC ................ *A21C 9/085* (2013.01); *A21C 9/08* (2013.01); *A21C 9/088* (2013.01); *A21D 2/02* (2013.01); *A21D 6/00* (2013.01); *B65G 15/16* (2013.01); *B65G 15/62* (2013.01); *B65G 2201/0202* (2013.01)

(58) Field of Classification Search
CPC ........... A21C 9/08; A21C 9/085; A21C 9/088; A21D 6/00; B65G 15/16; B65G 15/62
USPC ......................................................... 426/501
See application file for complete search history.

(56) References Cited

U.S. PATENT DOCUMENTS

| | | | | |
|---|---|---|---|---|
| 4,113,819 | A * | 9/1978 | Hayashi | A21C 3/022 264/171.27 |
| 5,516,538 | A * | 5/1996 | Ueno | A21C 3/06 426/231 |
| 6,207,212 | B1 * | 3/2001 | Nanahara | A21C 3/06 425/320 |
| 2009/0162512 | A1 | 6/2009 | Morikawa et al. | |

FOREIGN PATENT DOCUMENTS

| | | |
|---|---|---|
| DE | 3237844 A1 | 9/1983 |
| DE | 39 28 447 A1 | 3/1991 |
| DE | 42 04 377 A1 | 8/1993 |
| DE | 295 02 469 U1 | 4/1995 |
| DE | 202008003923 U1 * | 10/2008 |
| DE | 202008003923 U1 | 10/2008 |
| DE | 10 2008 000 523 A1 | 9/2009 |
| EP | 1747724 A2 * | 1/2007 |
| EP | 1747724 A2 | 1/2007 |
| EP | 2236039 A1 | 10/2010 |
| GB | 2110978 A | 6/1983 |
| NL | 8204931 A | 7/1984 |
| NL | 1021016 C2 | 1/2004 |
| NL | 1025310 C2 | 7/2005 |
| WO | 2012062267 A2 | 5/2012 |

OTHER PUBLICATIONS

English Translation of the International Preliminary Report on Patentability, PCTDE2011/001831, dated May 23, 2013.
EPO Summons of Oral Proceedings dated Jan. 28, 2021 (with partial English Machine Translation), Application No. 11817294.9-1017 / Patent No. 2637506, Applicant Fritsch Bakery Technologies GmbH & Co. KG, 22 Pages.
EP Opposition Dated Feb. 4, 2021, Application No. 11817294.9-1017 / Patent No. 2637506, Applicant Fritsch Bakery Technologies GmbH & Co. KG, 11 Pages.
EP Opposition Dated Feb. 4, 2021, Application No. 17165893.3-1017 / Patent No. 3216347, Applicant Fritsch Bakery Technologies GmbH & Co. KG, 12 Pages.
EP Opposition Dated Feb. 13, 2021, Application No. 17165893.3-1017 / Patent No. 3216347, 50 Pages.
EP Opposition Dated Feb. 14, 2021, Application No. 17165893.3-1017 / Patent No. 3216347, 54 Pages.
On Attached DVD: D1d—MVI-0147 (movie of the system) [Referenced in Notice of Opposition, Application No. 11817294.9, Sep. 6, 2019, (Patent No. EP2637506)].
On Attached DVD: D1j—Uitvoer Oprolunit Appetit de France 6676 20060216 (first movie of the modified croissant line running) [Referenced in Notice of Opposition, Application No. 11817294.9, Sep. 6, 2019, (Patent No. EP2637506)].
On Attached DVD: D1k—Video—2019-05-20-14-10-43 (movie of the modified croissant line still running 2019) [Referenced in Notice of Opposition, Application No. 11817294.9, Sep. 6, 2019, (Patent No. EP2637506)].
On Attached DVD: D1m—Afvoer Oprolunit 1 (second movie of the modified croissant line running, 2006) [Referenced in Notice of Opposition, Application No. 11817294.9, Sep. 6, 2019, (Patent No. EP2637506)].

(Continued)

*Primary Examiner* — Jyoti Chawla
(74) *Attorney, Agent, or Firm* — Brooks Kushman P.C.

(57) ABSTRACT

A device for orienting wound dough products includes a first conveyor belt circulating with a first conveying speed and transporting a wound dough product having an end protruding from a circumference of the dough product. A second conveyor belt receives the wound dough product from the first conveyor belt and circulates with a second conveying speed which is different from the first conveying speed. The difference between the first conveying speed and the second conveying speed sets the wound dough product received from the first conveyor belt in a desired rolling motion on the second conveyor belt, wherein after the wound dough product has reached a defined end position in which the end of the wound dough product abuts on the second conveyor belt, the rolling motion of the wound dough product stops.

20 Claims, 6 Drawing Sheets

(56) References Cited

OTHER PUBLICATIONS

On Attached DVD: D2d—IMG 6482 (movie recently recorded of the unaltered dough line) [Referenced in Notice of Opposition, Application No. 11817294.9, Sep. 6, 2019, (Patent No. EP2637506)].
On Attached DVD: D2e—IMG 6483 (slow motion version of the part of the same movie) [Referenced in Notice of Opposition, Application No. 11817294.9, Sep. 6, 2019, (Patent No. EP2637506)].
On Attached DVD: D3e—Uitvoer V-Moulder 70 Gram Deeg 10 Gram Creme 3 Nov. 11, 2009 (movie recorded Nov. 11, 2009) [Referenced in Notice of Opposition, Application No. 11817294.9, Sep. 6, 2019, (Patent No. EP2637506)].
On Attached DVD: D3f—Production Chocolate Croissants From Laminator to Proofer 1 Nov. 13, 2009 (movie recorded Nov. 13, 2009) [Referenced in Notice of Opposition, Application No. 11817294.9, Sep. 6, 2019, (Patent No. EP2637506)].
On Attached DVD: D5c—CIMG 1496 (movie of a croissant recorded in 2012) [Referenced in Notice of Opposition, Application No. 11817294.9, Sep. 6, 2019, (Patent No. EP2637506)].
On Attached DVD: D5d—R-Moulder incl Tip Corrector at Bridor P8463 May 2012 (movie recently recorded of the croissant line) [Referenced in Notice of Opposition, Application No. 11817294.9, Sep. 6, 2019, (Patent No. EP2637506)].
Rademaker, Confirmation de commande, Appetit de France, Jun. 30, 2004, 12 pages.
Rademaker, Drawing—Uitovoerbaan Croisssant Machine—Appetit de France, Dec. 21, 2004, 1 page.
Rademaker, Definitieve Orderkaart, Appetit de France, Jul. 9, 2004, 35 pages.
Rademaker, Bezoekrapport, Oct. 18, 2006, 3 pages (report of visit to Appetit de France).
Rademaker, Report, Jun. 13, 2005, 5 pages (report of visit to Appetit de France).
Rademaker, Drawing—Bandomleidingsas 1, Jul. 27, 2005, 11 pages.
Rademaker, Picture of the modification made in 2006, 1 page.
Rademaker, Fonctionnement, Appetit de France, date unknown, 118 pages.
Rademaker, Confirmation de commande, Ligne de calibrage et machine a croissants, Sarl Cerfab Bridor, Jul. 28, 2009, 10 pages.
Rademaker, Drawing—Ligne de Calibrage + Croissant, Oct. 19, 2009, 1 page.
Rademaker, Manuel D'Utilisation—Machine a Croissants, Sarl Cerfab Bridor, Apr. 2010, 244 pages.
Rademaker, Confirmation de Commande, Quattro et Machine a Croissants, Bridor Sarl Cerfab, Jun. 22, 2011, 19 pages.
Rademaker, Drawings, Bridor, Oct. 4, 2007, 1 page.
Rademaker, Confirmation de Commande, Ligne de Production de Vienoiseries, Sarl Cerfab Bridor, Apr. 4, 2007, 22 pages.
Rademaker, Definitieve Orderkaart, Laminator en croissant machine, Bridor, May 11, 2007, 44 pages.
Rademaker, Drawings—Quattro + Machine a Croissants, Bridor, Jun. 15, 2011, 1 page.
Rademaker, User Manual, Quick Quatro and Croissant Machine, Bridor Sarl Cerfab, May 2, 2012, 373 pages.
Rademaker, Manuale Per L'Operatore Linea a Croissant, Fresystem, Sep. 2009, 295 pages.
Rademaker, Acceptance Protocol, Customer: Fresystem, For Laminator & Croissantmachine & Decoration Line, Mar. 30, 2010, 2 pages.
Rademaker, Drawings, Laminator + Croissant Machine, Fresystem, Jan. 5, 2009, 1 page.
Rademaker, Order Confirmation, Laminator and Croissantline, Fresystem, Oct. 27, 2008, 20 pages.
Rademaker, Drawings, Project 6848 Lantmannen Pastrilux, date unknown, 2 pages.
Rademaker, Definitieve Orderkaart, Croissantmachine, Pastrilux S.A., Jun. 8, 2005, 15 pages.
Rademaker, Instellingen voorgevulde croissants op linjn 2, by Jan van Wees, Feb. 19, 2007, 2 pages.
Rademaker, Stretch Roller Synchronisation, Sep. 12, 2019, 4 pages.
Rademaker, Drawing—Croissantmachine + Diverse Units, Pastrilux, Feb. 12, 2009, 1 page.
Rademaker, Bezoekrapport, Pastrilux, Feb. 21, 2007, 4 pages.
Rademaker, Orderbevestiging, Croissantmachine voor lijn 2, Pastrilux S.A., May 23, 2005, 8 pages.
Rademaker, Drawing—Croissantlign, Pastrilux, Sep. 1, 2003, 1 page.
Rademaker, Intern Memo, Pastrilux, Jul. 10, 2003, 3 pages.
Rademaker, Orderbevestiging, Croissant machine, Pastrilux S.A., Sep. 29, 2003, 7 pages.
Rademaker, Drawing, Project 6421 Lantmannen Pastrilux, date unknown, 1 page.
Rademaker, Drawing—Croissantlign, 6421 Pastrilux, Nov. 5, 2010, 1 page.
Declaration of Mr. Didier Demailly of Delifrance S.A., Jul. 25, 2019, 2 pages.
Declaration of Mr. Patrick Elain of Bridor SAS, Aug. 26, 2019, 2 pages.
Declaration of Mr. Johannes Petrus Wiro van Wees of Rademaker B.V., Aug. 22, 2019, 2 pages.
European Patent Office, Notice of Opposition, Application No. 11817294.9, Sep. 6, 2019, 32 pages (Patent No. EP2637506).
European Patent Office, Notice of Opposition, Application No. 17165893.3, Sep. 18, 2019, 39 pages (Patent No. EP3216347).
European Boards of Appeal Communication dated Jun. 29, 2022, Application No. / Patent No. 11817294.9 / 2637506, Applicant Fritsch Bakery Technologies GmbH & Co. KG, 10 Pages.
Di3—Declaration dated Mar. 16, 2022, 2 Pages.

* cited by examiner

DEVICE FOR ORIENTING WOUND DOUGH PRODUCTS IN A DEFINED END POSITION

CROSS-REFERENCE TO RELATED APPLICATIONS

This application is a divisional application of U.S. patent application Ser. No. 13/883,225 filed on May 2, 2013 which represents the national stage entry of PCT International Application No. PCT/DE2011/001831 on Oct. 11, 2011 claiming the benefit of German Patent Application No. 10 2010 050 671.0 filed Nov. 9, 2010 and German Patent Application No. 10 2011 011 049.6 filed Feb. 11, 2011. The contents of these applications are hereby incorporated by reference as if set forth in their entirety herein.

STATEMENT REGARDING FEDERALLY SPONSORED RESEARCH OR DEVELOPMENT

Not applicable.

FIELD OF THE INVENTION

The present invention relates to a method and a device for orienting wound dough products, for example croissants, in a defined end position.

BACKGROUND OF THE INVENTION

In the industrial production of wound dough products, in particular croissants, it is desired that when baking the wound dough products, the tip of the wound dough band, the so-called end protruding on the outside on the circumference, rests in a defined position. For example, when cooking or baking croissants, it is preferred to arrange the end between the croissant itself and the baking support so as to prevent the end from standing up during the baking process since a far-protruding end burns easily and constitutes a quality defect. All in all, a defined end position for wound dough products is generally significant for obtaining reproducible baking results. For orienting wound dough pieces in a defined end position, different options arise from the state of the art. In the simplest option, the wound dough products are manually turned about their longitudinal axis, wherein by this orienting motion, the operator sets a defined end position in which the end comes to rest under the croissant, for example. However, this manual orientation requires a lot of time and effort and is therefore only convenient for very small quantities.

Another solution seeks to wind the dough products in a defined manner so that the end of the dough product takes the desired defined end position upon completion of the winding process. Such a solution is described, for example, by EP 2 236 039 A1. In the described winding device, the length of the winding distance can be adjusted in order to thereby change the overall rotation angle during the winding process. After adjusting the winding device, the dough products are then respectively wound in an identical manner and leave the winding device in the desired end position. It is disadvantageous in this device that the device cannot compensate process disruptions, which can be caused, for example, by variances in the thickness of the dough piece to be wound. Thus, said device is highly prone to disruptions and accordingly has to be readjusted when process disruptions occur, for example, when the thickness of the dough pieces varies.

Another device for the exact orientation of the end position of wound dough products is known from EP 1 747 724 A2. In this device, a sensor for detecting the position of the end after the winding of the dough product is provided. Depending on the result of the measurement of said sensor, the dough product is subsequently rotated by an angle about its longitudinal axis so as to thereby set the desired end position. Process disruptions can be recognized at any time by this device and can be compensated by a corresponding adjustment of the rotation angle. However, the high instrumental requirements are disadvantageous in this device because, for example, a video camera and an image processing system are necessary for recognizing the position of the end after the completion of the winding process.

Starting from said state of the art, it is therefore the object of the present invention to provide a novel method for orienting wound dough products in a defined end position which can be reliably implemented with simple means and, at the same time, provides a high degree of process stability even when the winding process is influenced by disruptive factors caused, for example, by variations in the thickness or the dough texture of the dough pieces to be wound. Further, it is the object of the present invention to provide different devices for the implementation of the method according to the invention.

SUMMARY OF THE INVENTION

These objects are attained by a method and by the devices described herein.

The method according to the invention is based on the fundamental idea that the rolling resistance of the wound dough product has an irregularity which is caused by the end protruding on the circumference of the dough product: In fact, when the wound dough product rolls on a support in a rotational direction which corresponds to the angle direction or the conveying direction of the dough product, then the rolling resistance increases significantly as soon as the protruding end comes to abut on the support. In order to be able to roll the dough product any further after the position has been reached in which the end comes to abut on the support, the torque provided for driving the dough product or the driving force provided for driving the dough product has to be increased to a point at which the gravitational center of the dough product is raised by the amount of the protrusion of the end. The method according to the invention for orienting the wound dough products advantageously utilizes this increase in the rolling resistance when the dough product rolls on a support after reaching the position in which the end comes to abut on the support.

In the method according to the invention, the wound dough products are driven along a predefined segment or for a predefined time with a predefined driving torque or a predefined driving force so as to rotate around the longitudinal axis so that the products roll on the support. The length of the rolling segment or the duration of the rolling time therein should be chosen to be at least long enough to make sure that the dough products can roll on the support for at least a full rotation. The rotational direction of the rolling motion of the dough product must be chosen such that it corresponds to the winding direction from the inside to the outside of the wound dough product because when the dough product rolls in the winding direction, the protruding end of the dough product comes to abut on the support and functions as a chock. As soon as the protruding end comes to abut on the support, the dough product has thus reached the desired defined end position and is stopped by the rolling resistance caused by the protruding end. The driving force causing the rolling motion or the driving torque causing the rolling motion therein has to be chosen to be below a predefined limit so that the rolling resistance caused by the end cannot be overcome. As a result, the dough products are oriented because of the rolling resistance caused by the protruding end due to the fact that the rolling motions on the support are always stopped as soon as the end comes to abut on the support. In this case, a position sensor for determining the position of the end at the start of the orienting process is not necessary because the different starting positions of the end are compensated through correspondingly different rolling lengths on the support. Since the rolling resistance of the rolling dough product changes significantly due to the protruding end, this change in the rolling resistance is reliably suited to effect the orientation of the dough products, wherein process disruption factors, such as a variation in dough thickness or dough texture, do not cause a disruption of the orientation process.

The magnitude of the driving torque or of the driving force for causing the rolling motion of the dough product on the support is to be adjusted to the respective orientation process. In any case, the driving torque or driving force provided for driving the dough products must be large enough for the dough product to be set in a rotational rolling motion after the winding process has been completed. Conversely, the driving torque or driving force may only be just large enough to ensure that the rolling motion is reliably stopped by the rolling resistance caused by the end and is reliably precluded after this defined end position has been reached.

It is generally optional which driving force is utilized for driving the dough products along the rolling segment provided for orienting them. According to a first preferred embodiment variation, a downhill slope force is utilized. This means, in other words, that the dough products roll on an inclined support, wherein the inclination of the support is as least large enough to ensure that the downhill slope forces acting on the wound dough products are sufficient to trigger and sustain the rolling motion. Conversely, the inclination of the support is only just large enough to ensure that the downhill slope force caused by the inclination does not suffice to overcome the rolling resistance caused by the protruding end so that the rolling dough products are stopped by the end coming to abut on the surface of the inclined support.

As an alternative to using an inclined support for driving the rolling dough products, a circulating brush drive can also be used. The bristles of the brush drive therein are to be realized such that when the brush drive circulates, they brush the dough products, thus transmitting sliding friction forces. The totality of these sliding friction forces therein leads to a torque which causes the rolling motion of the dough products on a support, which can then also run horizontally, for example.

According to another alternative, which is also suited in particular for horizontally running supports, the driving torque necessary for the rolling motion of the dough products is generated by accelerating or decelerating the wound dough products. Due to the change in the speed of the wound dough products, a torque acts on the dough products. Said torque can be utilized as a driving torque for allowing the dough products to roll on the support in the desired manner for the correct positional orientation.

The deceleration or acceleration of the dough products can preferably be achieved by transferring the dough products from a first conveyor belt to a second conveyor belt. The conveying speeds of the two conveyor belts are different, resulting in the desired accelerating or decelerating effect. In this way, the dough products roll on the second conveyor belt in the desired rotational direction until the end comes to abut on the support, thus stopping the dough product. The difference in the conveying speeds of the two conveyor belts therein should at maximum be just large enough to preclude a rolling-over of the end during the rolling process.

According to the invention, the change in the rolling resistance, which occurs in the area of the protruding end when the dough product rolls, is utilized for orienting the dough products in a defined end position. In order to further increase the reliability of this orientation method, it is particularly advantageous if prior to winding, the dough piece is reshaped, in particular by a sectional rolling-out, in such a manner that the end of the dough piece forms a bulge. In other words, this means that the dough piece is thicker in the area of the end than in the rest of the dough piece. This increased thickness of the end causes the end to further radially protrude, and thus a correspondingly higher rolling resistance is caused. Accordingly, the dough product can then be driven in the rolling motion with a slightly larger driving torque or with a slightly higher driving force because the limit at which the dough product would roll over the protruding end is correspondingly higher.

In the method according to the invention, the dough product is oriented in a defined end position in which the protruding end comes to abut on the support. However, this end position often does not correspond to the end position desirable for the further processing of the dough products. In order to achieve this second end position, it is therefore particularly advantageous if after reaching the first defined end position, the dough product is rolled by a defined angle by implementing the method according to the invention. However, since the angular position of the first defined end position is known, a fixedly adjusted rolling angle can be used for adjusting the second defined end position.

According to a preferred method variation, the dough product is rolled from its first defined end position, in which the protruding end comes to abut on the support, into a second defined end position in which the protruding end comes to lie between the dough product and the support. This second defined end position is particularly well suited for producing croissants with a defined baking result.

Further, it is preferred that the wound dough product is compressed in the second end position and the end of the wound dough product is thus compressed between the dough product and the support so that the end is pressed and laid against the circumference of the wound dough product. In doing so, a particularly regular and reproducible form of the baked dough product can be realized and, at the same time, the dough product is prevented from unintentionally rolling away during the further process.

By implementing the method according to the invention, wound dough products, which are additionally bent around their vertical axis prior to baking, can be processed without manual orientation. According to a preferred method variation, it is therefore provided that the wound dough product is bent around its vertical axis after being oriented into an end position so as to bring the two tips of the wound dough product closer together. In particular, it can be provided therein that the tips of the wound dough product are brought into contact with each other and, for example, are pressed together in order to fix the bent shape of the wound dough product.

For implementing the method according to the invention, several alternative devices are proposed. In the first variant of a device, an inclined support is provided for orienting the wound dough products, on which the wound dough products roll under the influence of the downhill slope force caused by the inclination. The inclination angle of the support therein must be chosen such that the downhill slope force is strong enough to start the rolling motion of the wound dough products and to sustain it until the end position is reached, in which the protruding end comes to abut on the support. Conversely, the inclination angle of the support has to be limited to the effect that the downhill slope force caused by the inclination does not suffice to allow a rolling motion to continue beyond the protruding end. Instead, the rolling resistance caused by the protruding end must be sufficient to reliably stop the rolling motion of the wound dough product after the end has come to abut on the support.

For being able to adapt the device with the inclined support to different dough products, it is particularly advantageous if the inclination angle of the support is adjustable. By increasing the inclination angle, the downhill slope force can be increased or it can be decreased by reducing the inclination angle.

As an alternative to the first variant of the device, another device is proposed for implementing the method according to the invention, in which a brush drive is provided for driving the wound dough products along the orientation segment. The brush drive therein is to be realized and positioned in such a manner that the bristles of the brush drive brush along the dough products and thus by sliding friction transmit the force necessary for rolling the dough products. On the one hand, the transmitted sliding friction must be high enough to initiate and sustain the rolling motion of the dough products. On the other hand, the total sliding friction may only be just high enough to reliably stop the rolling dough products by the protruding end coming to abut on the support.

In order to be able to variably change the conveying speed of the dough products by the rolling motion during the orientation, it is particularly advantageous if the support, on which the dough products roll for their orientation, is realized in the manner of a continuously driven conveyor belt.

According to a further variant of the device, it is provided that the device comprises a first and a second conveyor belt, which preferably run horizontally and which each can be driven with different conveying speeds. The difference in the conveying speeds causes a torque acting on the dough products when they are transferred from the first conveyor belt to the second conveyor belt, which torque can be utilized for the desired rolling motion.

The conveying speed of the first conveyor belt and/or the conveying speed of the second conveyor belt should preferably be adjustable, in particular variably controllable, so as to be able to change the torque necessary for the rolling motion according to marginal conditions.

In order to be able to orient the dough products after their orientation in the first defined end position, in which the end comes to abut on the support, into a second defined end position which is different from the first defined end position, an adjusting device can be arranged downstream. Said adjusting device is characterized in that it rolls the dough products starting from the position in the first defined end position by a defined angle so as to thereby adjust the second defined end position.

Alternatively or additionally to the adjusting device, a flat-pressing device can be arranged downstream of the device for orienting the dough products. In said flat-pressing device, the dough products, which are in a position in which the protruding end comes to lie between the dough product and the support, are compressed to a certain extent so that the end is pressed against the circumference of the dough product, the end is laid against the dough product and the position is simultaneously fixed on the conveyor belt.

For adjusting and flat-pressing the wound dough products, a combined adjusting and flat-pressing device can be preferably provided, which is arranged downstream of the device for orienting the dough products in the defined end position. Said combined adjusting and flat-pressing device is realized in the manner of a continuously driven flat-pressing conveyor belt, which is arranged above the support for orienting the wound dough products. The distance between the support and the flat-pressing conveyor belt decreases in the transport direction of the dough products so that the dough products are continuously compressed by this gradual narrowing. Also, the flat-pressing conveyor belt can be driven relative to the support with a differential speed so as to thereby cause a rotational motion of the dough products. The differential speed is to be chosen such that as a result, the desired angular adjustment is achieved by which the dough products are transferred from the first defined end position into the second defined end position.

BRIEF DESCRIPTION OF THE DRAWINGS

Different variations of the invention are exemplarily described in the drawings as follows.

DETAILED DESCRIPTION OF THE EXAMPLE EMBODIMENTS

Figure 1:
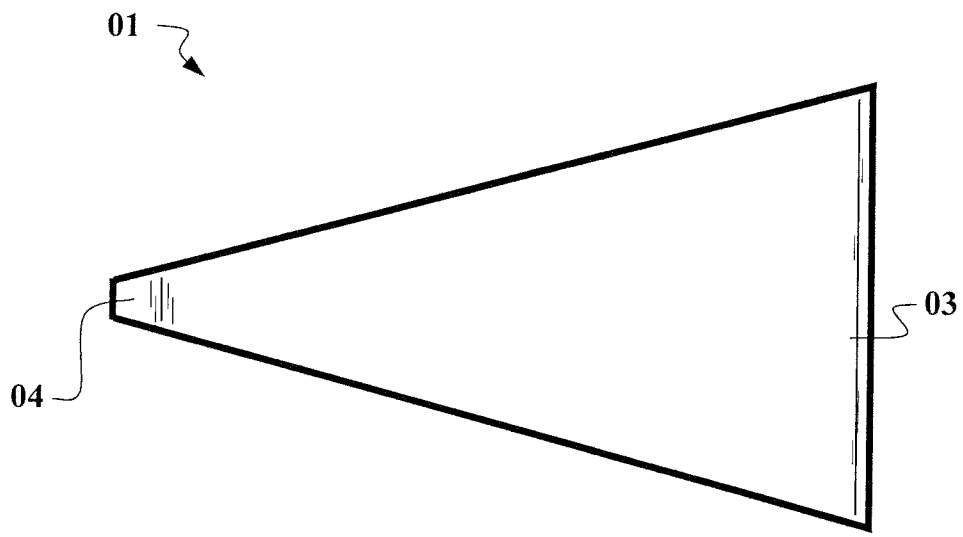
FIG. 1 shows a trapezoidal dough piece for the production of a wound dough product, namely a croissant, in a top view.

FIG. 1 shows a trapezoidal dough piece 01, from which a wound dough product 02 (see FIG. 4) can be produced. The dough piece 01 comprises a base 03 and a narrow tip 04. Due to this trapezoidal shape of the dough piece 01, a wound shape can be achieved when the dough piece 01 is wound around the base 03, as it corresponds to the usual shape of croissants. The narrow tip 04 can also be a little broader or entirely pointed.

Figure 2:
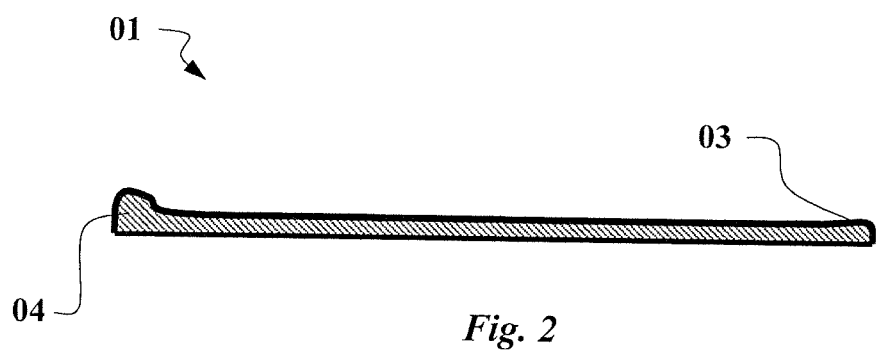
FIG. 2 shows the dough piece according to FIG. 1 after the rolling-out according to a first method variation.
Figure 3:
FIG. 3 shows the dough piece according to FIG. 1 after the rolling-out according to a second method variation.

FIG. 2 and FIG. 3 each show the dough piece 01 in a cross-section, wherein FIG. 2 and FIG. 3 differ from each other in that they show two different variations of the rolling-out of the dough piece prior to winding. In the variation illustrated in FIG. 2, the dough piece 01, whose thickness initially corresponds to the thickness of the narrow tip 04, is rolled out along its longitudinal extension with a uniform thickness so that after the rolling-out the narrow tip 04 forms a bulge. In the variation according to FIG. 3, for rolling out the dough piece 01, the roller is slowly lifted in the direction of the narrow tip 04 so that the thickness of the dough piece 01 continuously increases in the direction of the narrow tip 04. Here, too, the narrow tip 04 forms the maximum bulge of the dough piece 01.

Figure 4:
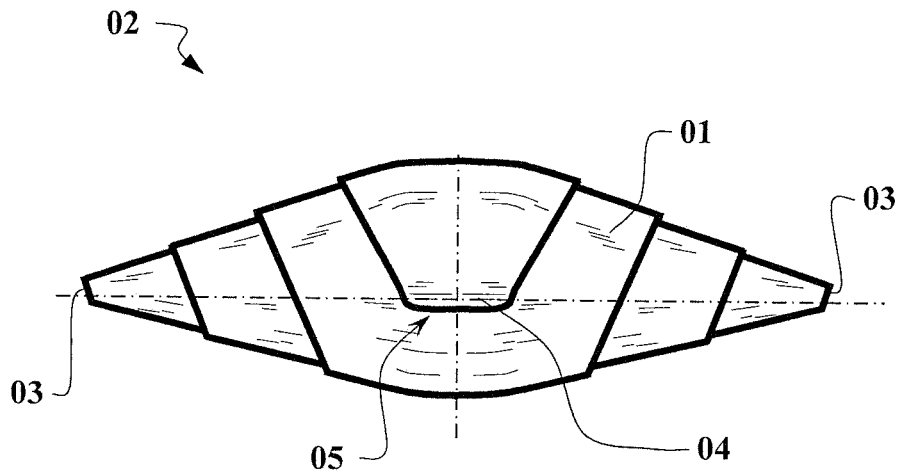
FIG. 4 shows the dough product wound from the dough piece according to FIG. 1 in a top view.

FIG. 4 shows the dough product 02 wound from the dough piece 01, which product has the shape of an unbent croissant. The core of the dough product 02 is formed by the base 03 around which the dough piece 01 is wound. The narrow tip 04 forms a protruding end 05 on the outer circumference of the dough product 02.

Figure 5:
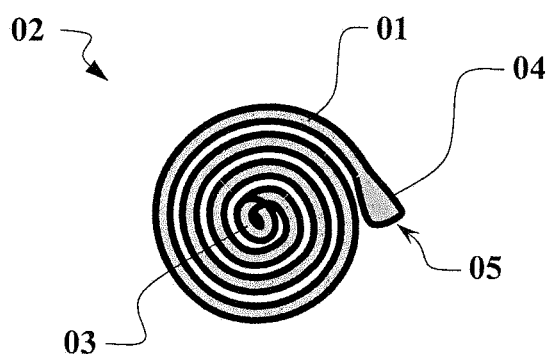
FIG. 5 shows the wound dough product according to FIG. 4 in a schematic cross-section.

FIG. 5 shows the dough product 02 in a cross-section. The base 03 in the center of the dough product 02 and the protruding end 05, which is formed by the bulge of the narrow tip 04 of the dough piece 01, are visible.

Figure 6:
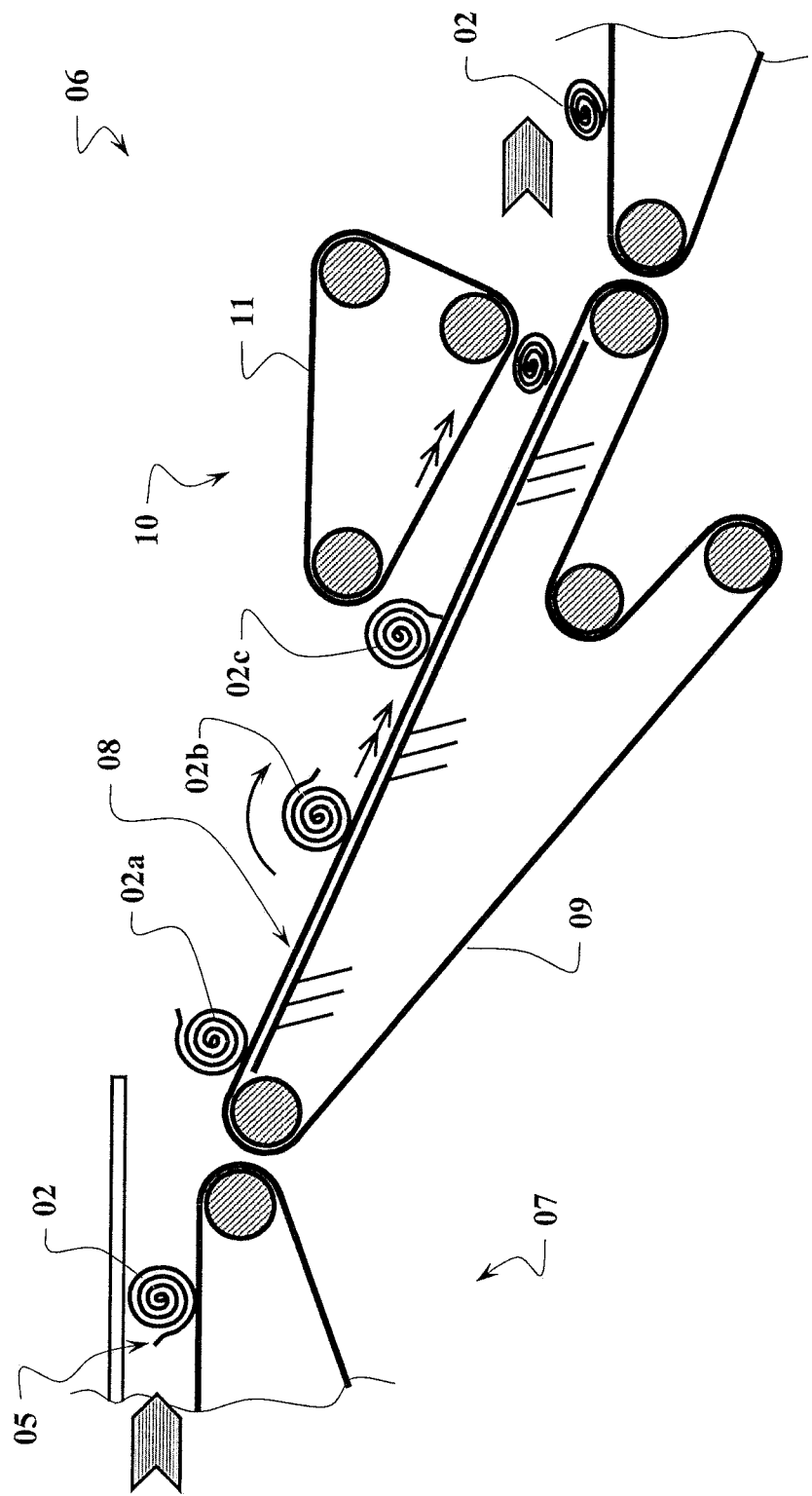
FIG. 6 shows a first device for orienting the wound dough product according to FIG. 4 in a defined end position.

FIG. 6 shows a device 06 for orienting the dough products 02 in a defined end position. In a winding device 07 upstream of the device 06, dough products 02 are wound from dough pieces 01, wherein the position of the end 05 is undefined when they leave the winding device 07. The dough pieces 02 are transferred with an undefined end position from the winding device 07 to the downstream device 06. The device 06 comprises an inclined support 08 which is formed by a circulating conveyor belt 09. As soon as a dough product 02 is transferred to the support 08, the dough product 02 begins to roll on the support, wherein the rolling motion is initiated and sustained by the downhill slope force caused by the inclination of the support 08. The inclination direction of the support 08 therein is adjusted to the winding direction from the inside to the outside of the dough products 02 such that in the illustrated embodiment, the dough product 02 has a winding direction in the clockwise sense and the dough products 02 roll on the inclined support 08 in a clockwise sense. In this way, it is made sure that the protruding end 05 comes to abut on the support 08 after a non-predefined rolling segment and thus takes the first defined end position. The dough product 02c shows the dough product 02 after reaching said defined end position. Due to the protruding end 05 abutting on the support 08, the rolling motion of the dough product 02 is stopped, wherein the inclination of the support 08 does not suffice to allow the dough product 02 to roll over the protruding end 05.

After the orientation of the dough products 02 an adjusting of the end position and a flat-pressing of the dough products is further envisaged. For this, a combined adjusting and flat-pressing device 10 is used, which is formed by a circulating conveyor belt 11. The conveyor belt 11 is arranged opposite the conveyor belt 09, the distance between the conveyor belt 11 and the conveyor belt 09 growing narrower in the transport direction of the dough products 02. The dough products 02 are transported through this narrowing gap. Due to the differential circulating speed of the conveyor belt 11 in relation to the circulating speed of the conveyor belt 09, the dough products are rotated by a predefined angle so that the dough products 02 take a second defined end position when leaving the device 10.

The circulating speed of the conveyor belt 09 therein is higher than the circulating speed of the conveyor belt 11 so that the dough product 02 does not roll over the end 05 during adjusting in the second end position, but is moved to rotate in the contrary direction, which, in the illustrated example, is counterclockwise. Thereby, the formation of wrinkles in the dough product during the adjusting of the second end position is precluded. In this second defined end position, the end 05 is positioned between the dough product 02 and the support 08 and in this position is pressed against the dough product 02. After leaving the device 10, the dough products 02 are transported in the second defined end position for further processing.

Figure 7:
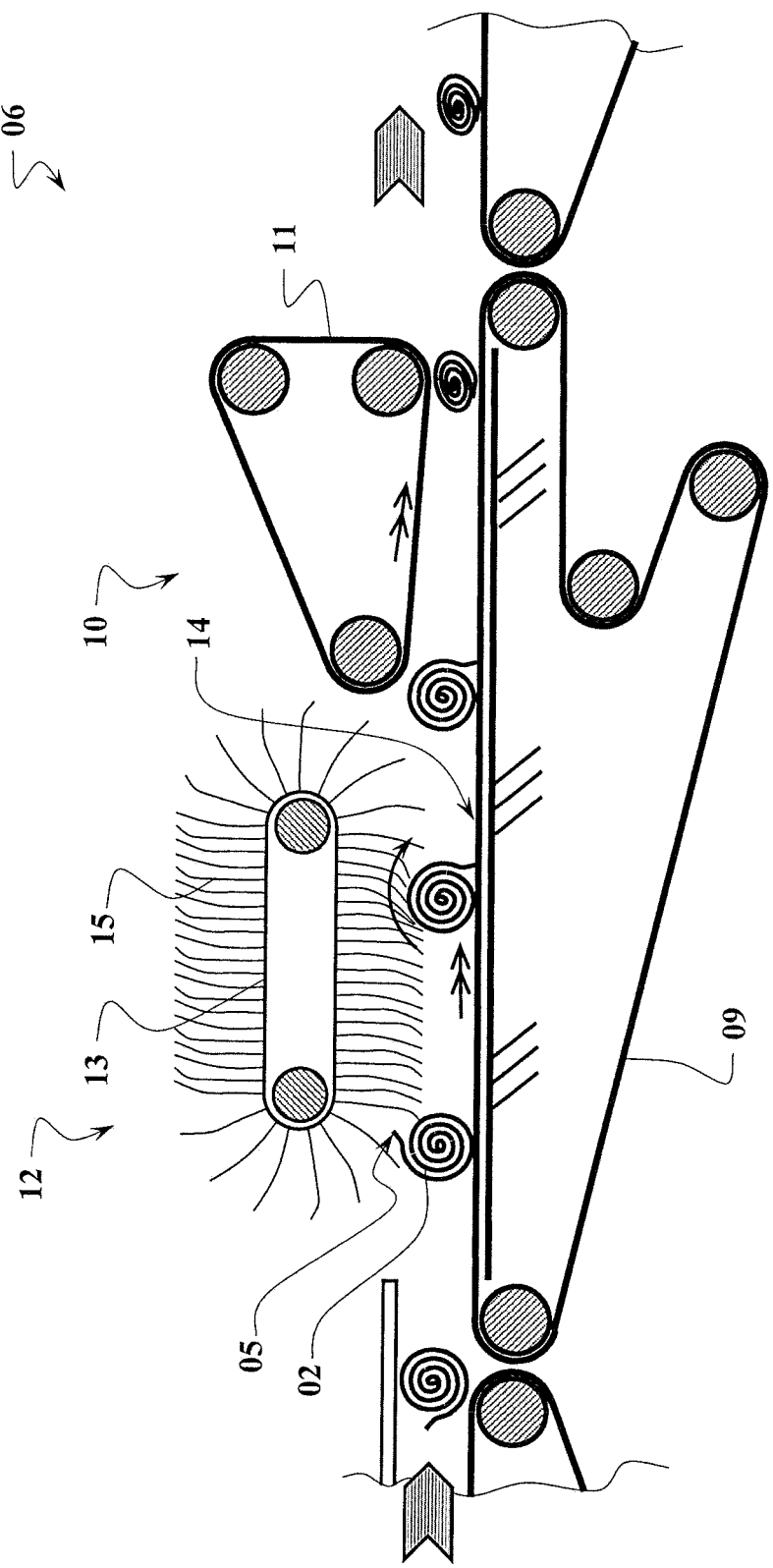
FIG. 7 shows a second device for orienting the wound dough product according to FIG. 4 in a defined end position.

FIG. 7 shows a second device 12 for orienting the dough products 02 in the first defined end position. After the winding of the dough products 02 in the winding device 07, they are now transferred to the downstream device 12 in which a circulating brush drive 13 is provided for driving the dough products 02 to roll on the support 14, which is oriented horizontally. The dough products 02 initially positioned with an undefined end position come into sliding frictional contact with the bristles 15 of the brush drive 13, wherein a sliding friction force is transmitted to the dough products 02 due to the different driving speeds of the conveyor belt 09 and the brush drive 13, which makes the dough products 02 roll clockwise on the support 14. The dough products 02 keep on rolling until the protruding end 05 comes to abut on the support 14, thereby stopping the rolling motion. The length of the brushes in the transport direction should be longer than the circumference of the croissant. The length of the brush drive is preferably chosen such that the brushes come out of contact after a little more than one rotation of the croissant. Thus, the dough product 02 has reached the first defined end position and is then adjusted and compressed in a combined manner by the device 10.

Figure 8:
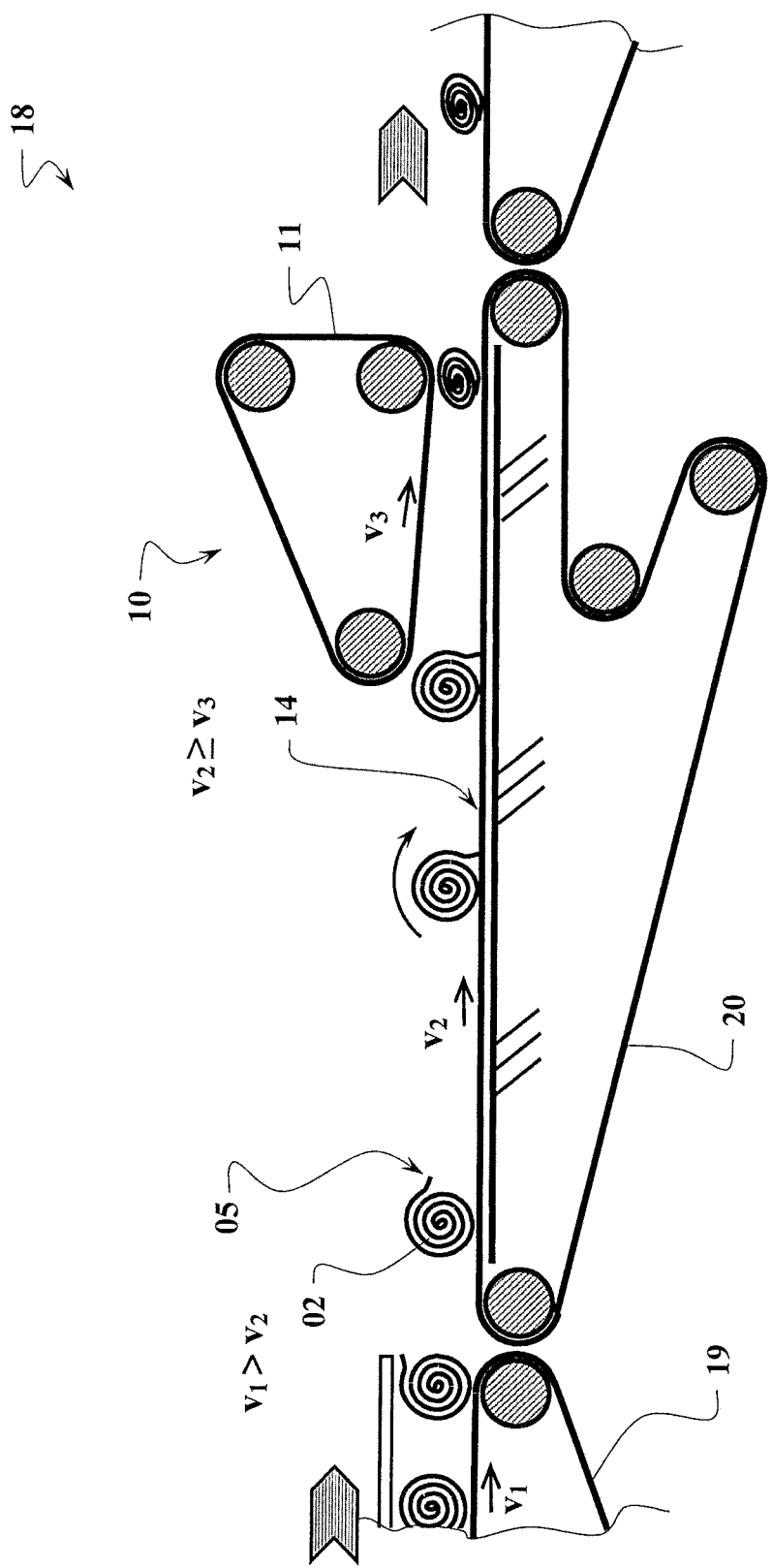
FIG. 8 shows a third device for orienting the wound dough product according to FIG. 4 in a defined end position.

FIG. 8 shows a third device 18 with two conveyor belts 19 and 20. The conveying speed $v_1$ of the conveyor belt 19 is higher—for example twice as high—than the conveying speed $v_2$ of the conveyor belt 20. Due to the difference in the conveying speeds $v_1$ and $v_2$, the dough products 02 are decelerated when being transferred from the conveyor belt 19 to the conveyor belt 20. Due to this deceleration of the dough products 02, a torque acts on the dough products 02, which makes the dough products roll clockwise on the conveyor belt 20 until the end 05 comes to abut on the support. The conveying speeds $v_1$ and $v_2$ of the conveying belts 19 and 20 can be changed variably, in particular controlled variably, so as to make it possible to variably change the rotational direction and strength of the torque acting on the dough products 02. Optionally, the conveying speed $v_1$ of the feeding conveyor belt can be higher or lower that the conveying speed $v_2$ of the downstream receiving conveyor belt.

Figure 9:
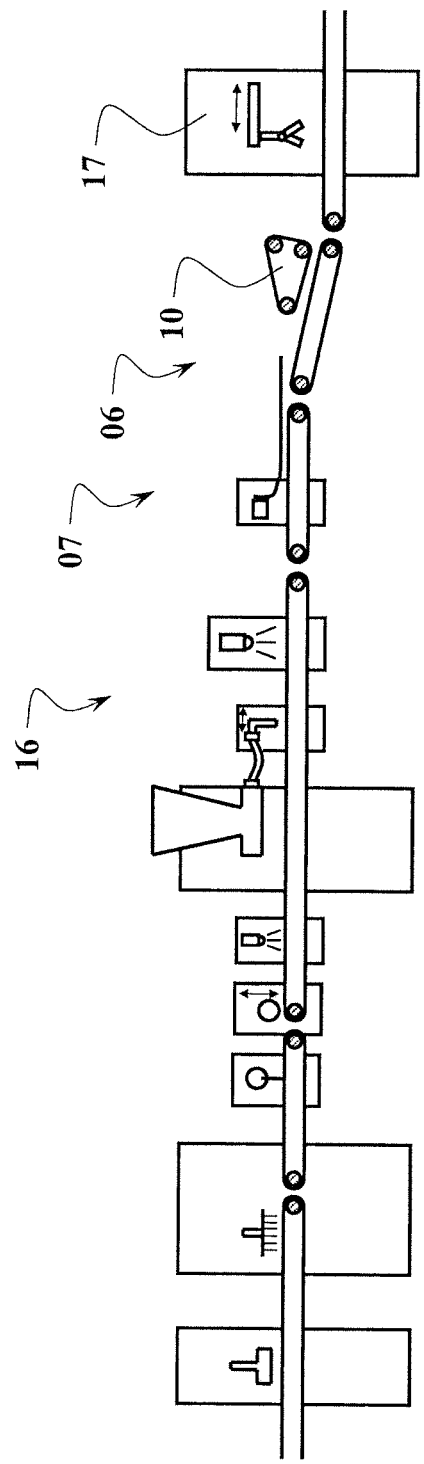
FIG. 9 shows a schematically illustrated production line for the production of croissant dough pieces which comprises a device according to FIG. 6.

FIG. 9 shows a production line 16 for the production of croissants. After passing through different processing stations, the dough pieces 01 are processed in a winding device 07 for the production of wound dough products 02. Subsequently, the dough products 02 are oriented in the device 06 with an initially undefined end position and are adjusted and pressed flat by the device 10. Then, the dough products 02 with a now defined end position can be bent around their longitudinal axis by means of a gripper system 17.

The invention claimed is:

1. A device for orienting wound dough products in a defined end position, the device comprising:
   a first conveyor belt; and
   a second conveyor belt downstream of the first conveyor belt, the second conveyor belt arranged to directly receive a wound dough product having an end protruding from a circumference of the dough product on an upper surface of the second conveyor belt from the first conveyor belt, wherein the device is configured to drive the first conveyor belt with a first conveying speed ($v_1$) and to drive the second conveyor belt with a second conveying speed ($v_2$) which is different from the first conveying speed, the difference between the first conveying speed ($v_1$) and the second conveying speed ($v_2$) being selected such that when the wound dough product is transported from the first conveyor belt to the second conveyor belt, the wound dough product is set in a rolling motion on the second conveyor belt, and after the wound dough product has reached a defined end position in which the end of the wound dough product abuts on the second conveyor belt, the rolling motion of the wound dough product is precluded due to rolling resistance caused by the end of the wound dough product.

2. The device according to claim 1, in which the conveying speed ($v_1$) of the first conveyor belt and/or the conveying speed ($v_2$) of the second conveyor belt is adjustable.

3. The device according to claim 2, further comprising a continuously driven flat-pressing conveyor belt downstream of the first conveyor belt, wherein a distance between the second conveyor belt and the flat-pressing conveyor belt is smaller than the diameter of the dough product on a side of an entry and becomes smaller in the transport direction in the direction of an exit side of the wound dough pieces, and wherein the support and the flat-pressing conveyor belt are driven with a differential speed selected to roll the wound dough product by a defined angle from the first end position into the second end position.

4. The device according to claim 1, in which the end protruding from the circumference of the wound dough product includes a tip forming a bulge of the dough piece.

5. The device according to claim 1, in which said second conveyor belt is inclined to have a downhill slope creating a downhill slope force driving the rolling motion of the wound dough product, said downhill slope force being caused by dead weight of the wound dough product on the inclined second conveyor belt.

6. The device according to claim 5, in which said slope is sufficient to cause said wound dough product to roll until the end of the wound dough product abuts the second conveyor belt, but not sufficient to cause said wound dough product to roll over the end of the wound dough product.

7. The device according to claim 1, including a circulating brush drive having bristles, the circulating brush drive including a circulating brush mounted above the upper surface of the second conveyor belt at a distance selected to engage the bristles with the wound dough product and to create sliding friction forces driving the rolling motion of the dough product.

8. The device according to claim 7, including a flat-pressing device downstream of the first conveyor belt, said flat-pressing device compressing the wound dough product in the second end position so as to press the end of the wound dough product against the circumference of the wound dough product and, at the same time, preclude the wound dough product from rolling any further.

9. The device according to claim 1, including an adjusting device downstream of the first conveyor belt, said adjusting device rolling the wound dough product by a defined angle into a second end position after the wound dough product has reached the defined end position in which the end of the wound dough product abuts on the second conveyor belt.

10. The device according to claim 1, in which said wound dough product has an unwound dough product thickness, and said end protruding from the circumference of the wound dough product includes a tip having a thickness greater than said unwound dough product thickness, said tip forming a bulge of the wound dough product.

11. A device for orienting wound dough products in a defined end position, the device comprising:
a first conveyor belt configured to transport a wound dough product on an upper surface of the first conveyor belt, the wound dough product having an end protruding from a circumference of the dough product; and
a second conveyor belt downstream from the first conveyor belt and arranged to directly receive the wound dough product from the first conveyor belt on an upper surface of the second conveyor belt, wherein the device is configured to drive the first conveyor belt with a first conveying speed ($v_1$) and to drive the second conveyor belt with a second conveying speed ($v_2$) which is different from the first conveying speed, the difference between the first conveying speed ($v_1$) and the second conveying speed ($v_2$) selected so that when the wound dough product is received from the first conveyor belt, the wound dough product is set in a rolling motion on the second conveyor belt, and the rolling motion stops once the wound dough product has reached a defined end position in which a bulge at a tip of the end of the wound dough product abuts the second conveyor belt.

12. The device according to claim 11, in which the conveying speed ($v_1$) of the first conveyor belt and/or the conveying speed ($v_2$) of the second conveyor belt is adjustable.

13. The device according to claim 12, including a combined adjusting and flat-pressing device downstream of the first conveyor belt.

14. The device according to claim 13, in which the combined adjusting and flat-pressing device is a continuously driven flat-pressing conveyor belt, wherein a distance between the second conveyor belt and the flat-pressing conveyor belt is smaller than the diameter of the dough product on a side of an entry and becomes smaller in the transport direction in the direction of an exit side of the wound dough pieces, and wherein the second conveyor belt and the flat-pressing conveyor belt can be driven with a differential speed in order to roll the wound dough product by a defined angle from the first end position into the second end position.

15. The device according to claim 11, in which said second conveyor belt is inclined to have a downhill slope creating a downhill slope force driving the rolling motion of the wound dough product, said downhill slope force being caused by dead weight of the wound dough product on the inclined second conveyor belt.

16. The device according to claim 11, including a circulating brush drive having bristles, the circulating brush drive being mounted above the upper surface of the second conveyor belt at a distance selected to engage the bristles with the wound dough product and to create sliding friction forces driving the rolling motion of the dough product.

17. The device according to claim 11, including an adjusting device downstream of the first conveyor belt, said adjusting device rolling the wound dough product by a defined angle into a second end position after the wound dough product has reached the defined end position in which the end of the wound dough product abuts on the second conveyor belt.

18. The device according to claim 17, including a flat-pressing device downstream of the adjusting device, said flat-pressing device compressing the wound dough product in the second end position so as to press the end of the wound dough product against the circumference of the wound dough product and, at the same time, preclude the wound dough product from rolling any further.

19. The device according to claim 11, in which said wound dough product has an unwound dough product thickness, and said end protruding from the circumference of the wound dough product including the tip having a thickness greater than said unwound dough product thickness, said tip forming the bulge.

20. A device for orienting wound dough products in a defined end position, the device comprising:
- a first conveyor belt configured to circulate with a first conveying speed ($v_1$) and to transport a wound dough product having an end protruding from a circumference of the dough product on an upper surface of the first conveyor belt; and
- a second conveyor belt downstream from the first conveyor belt and arranged to directly receive the wound dough product from the first conveyor belt on an upper surface of the second conveyor belt and configured to circulate with a second conveying speed ($v_2$) which is different from the first conveying speed, the difference between the first conveying speed ($v_1$) and the second conveying speed ($v_2$) being selected to set the wound dough product received from the first conveyor belt in a desired rolling motion on the second conveyor belt until the wound dough product has reached a defined end position in which the end of the wound dough product abuts on the second conveyor belt.

* * * * *

UNITED STATES PATENT AND TRADEMARK OFFICE
CERTIFICATE OF CORRECTION

PATENT NO. : 11,425,914 B2  
APPLICATION NO. : 15/217472  
DATED : August 30, 2022  
INVENTOR(S) : Udo Bernhardt et al.

Page 1 of 1

It is certified that error appears in the above-identified patent and that said Letters Patent is hereby corrected as shown below:

On the Title Page

Delete:
"(73) Assignee: FRISCH BAKERY TECHNOLOGIES GMBH & CO. KG,
             Markt Einersheim (DE)"
And Insert:
-- (73) Assignee: FRITSCH BAKERY TECHNOLOGIES GMBH & CO. KG,
             Markt Einersheim (DE) --

Signed and Sealed this  
Fourth Day of July, 2023

Katherine Kelly Vidal  
*Director of the United States Patent and Trademark Office*